United States Patent
Maekawa et al.

(10) Patent No.: US 11,602,817 B2
(45) Date of Patent: Mar. 14, 2023

(54) MACHINING SYSTEM AND MACHINING METHOD

(71) Applicant: FANUC CORPORATION, Yamanashi (JP)

(72) Inventors: Susumu Maekawa, Yamanashi (JP); Zheng Tong, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 470 days.

(21) Appl. No.: 16/835,389

(22) Filed: Mar. 31, 2020

(65) Prior Publication Data
US 2020/0338678 A1 Oct. 29, 2020

(30) Foreign Application Priority Data

Apr. 26, 2019 (JP) .............................. JP2019-085859

(51) Int. Cl.
G05B 19/40 (2006.01)
B23Q 15/14 (2006.01)
G05B 19/402 (2006.01)

(52) U.S. Cl.
CPC ........... B23Q 15/14 (2013.01); G05B 19/402 (2013.01); G05B 2219/50132 (2013.01); G05B 2219/50256 (2013.01)

(58) Field of Classification Search
CPC .................. B23G 15/14; G05B 19/402; G05B 2219/50132; G05B 2219/50256; G05B 2219/37404
See application file for complete search history.

(56) References Cited

U.S. PATENT DOCUMENTS

| 5,570,190 A | * | 10/1996 | Terawaki | ............... | G01B 11/00 356/400 |
| 5,647,707 A | * | 7/1997 | Poulin | ....................... | B27C 9/04 409/164 |

(Continued)

FOREIGN PATENT DOCUMENTS

| JP | S62-114861 A | 5/1987 |
| JP | H04-223841 A | 8/1992 |

(Continued)

OTHER PUBLICATIONS

An Office Action; "Notice of Reasons for Refusal", mailed by the Japanese Patent Office dated Nov. 2, 2021, which corresponds to Japanese Patent Application No. 2019-085859 and is related to U.S. Appl. No. 16/835,389; with English language translation.

*Primary Examiner* — Rina I Duda
(74) *Attorney, Agent, or Firm* — Studebaker & Brackett PC

(57) ABSTRACT

A machining system includes: a jig retaining a plurality of workpieces; a measurement device measuring the retained plurality of workpieces; and a machining device machining the retained plurality of workpieces. The jig has a reference part positioned or position detected by the machining device. The measurement device has: a measurement unit measuring a positional relationship of the retained plurality of workpieces relative to the reference part, and an input unit using a recording medium or communication to input measured positional information of the plurality of workpieces to the machining device. The machining device has: a jig coordinate system specifying unit specifying a coordinate system of the jig, by positioning or position measuring the reference part, and a workpiece coordinate system setting unit individually setting coordinate systems of each of the (Continued)

plurality of workpieces, based on the specified coordinate system, and the inputted positional information.

10 Claims, 3 Drawing Sheets

(56) References Cited

U.S. PATENT DOCUMENTS

| | | | |
|---|---|---|---|
| 6,236,896 B1* | 5/2001 | Watanabe | B25J 9/1692 |
| | | | 700/192 |
| 2003/0163928 A1* | 9/2003 | Kato | B23Q 11/0003 |
| | | | 33/568 |
| 2011/0228242 A1 | 9/2011 | Wahlsten et al. | |
| 2014/0263583 A1* | 9/2014 | Hsiao | H01L 24/81 |
| | | | 228/180.1 |
| 2017/0052534 A1* | 2/2017 | Ghanem | G05B 19/402 |

FOREIGN PATENT DOCUMENTS

| | | |
|---|---|---|
| JP | H05-345256 A | 12/1993 |
| JP | H06-131019 A | 5/1994 |
| JP | 2003-340680 A | 12/2003 |
| JP | 2007265237 A | 10/2007 |
| JP | 2008-080412 A | 4/2008 |
| JP | 2017-144534 A | 8/2017 |

* cited by examiner

MACHINING SYSTEM AND MACHINING METHOD

This application is based on and claims the benefit of priority from Japanese Patent Application No. 2019-085859, filed on 26 Apr. 2019, the content of which is incorporated herein by reference.

BACKGROUND OF THE INVENTION

Field of the Invention

The present invention relates to a machining system and a machining method.

Related Art

Upon machining a workpiece in a machining device such as a machining center, for example, there are cases necessitating the measuring of a position of a workpiece (including posture information) retained in the machining device, and deciding the relative position between a tool and workpiece. When measuring the shape of a workpiece inside of a machining device, since the cycle time lengthens, there is concern over the machining efficiency declining. In addition, if performing measurement of a workpiece by pausing the long time machining, the temperature of the machining device will decline during measurement, and the temperature will rise again during machining; therefore, there is a risk of the machining precision declining due to thermal displacement.

As a method of measuring positions of a workpiece in a relatively short time, there is a method using an image processing technique. As an example, Patent Document 1 listed below discloses a machining device including: a mobile means which retains a workpiece; a photographing means which is provided at a photographing area at which photographing a machined part of a workpiece retained by the mobile means; and a positional shift detection means which, based on an image photographed by the photographing means, detects positional shift of the machined part, and includes a workpiece correction device which corrects the positional shift, and moves the workpiece from the photographing area to the machining area by driving the mobile means according to the positional shift and a predetermined movement distance from the photographing area until a machining area for machining the machined part.

Patent Document 1: Japanese Unexamined Patent Application, Publication No. 2007-265237

SUMMARY OF THE INVENTION

As disclosed in Patent Document 1, when providing a photographing means inside of a machining device, for example, there is concern over not being able to appropriately photograph a workpiece due to dirtying of the photographing means by dust, cutting oil, etc., poor lighting of the workpiece, vibration, etc., and no longer being able to accurately measure the position of the workpiece. For this reason, technology has been demanded which is able to accurately measure the position of a workpiece without increasing the cycle time of machining.

A machining system according to an aspect of the present disclosure includes: a jig which retains a plurality of workpieces; a measurement device which measures a plurality of workpieces retained on the jig; and a machining device which machines the plurality of workplaces retained on the jig, in which the jig has a reference part which is positioned or position detected by the machining device, and in which the measurement device has: a measurement unit which measures a positional relationship of the plurality of workpieces retained on the jig relative to the reference part, and an input unit which uses a recording medium or communication to input positional information of the plurality of workpieces measured by the measurement unit to the machining device, and in which the machining device has: a jig coordinate system specifying unit which specifies a coordinate system of the jig, by positioning or position measuring the reference part of the jig, and a workpiece coordinate system setting unit which individually sets coordinate systems of each of the plurality of workpieces, based on a coordinate system of the jig specified by the jig coordinate system specifying unit, and the positional information inputted from the input unit.

A machining method according to another aspect of the present disclosure includes the steps of: retaining a plurality of workpieces in a jig having a reference part which is positioned or positionally detected by a machining device; measuring a positional relation of the plurality of workpieces retained on the jig relative to the reference part; moving the jig to the machining device; specifying a coordinate system of the jig by positioning or positionally measuring the reference part of the jig in the machining device; setting the coordinate systems of each of the plurality of workpieces individually, based on the coordinate system of the jig, and the positional relationship of the plurality of workpieces relative to the reference part; and machining the workpiece by way of the machining device using the coordinate system of the workpiece.

According to an aspect of the present disclosure, the machining system can accurately measure the position of a workpiece without increasing the cycle time of machining.

DETAILED DESCRIPTION OF THE INVENTION

Figure 1:
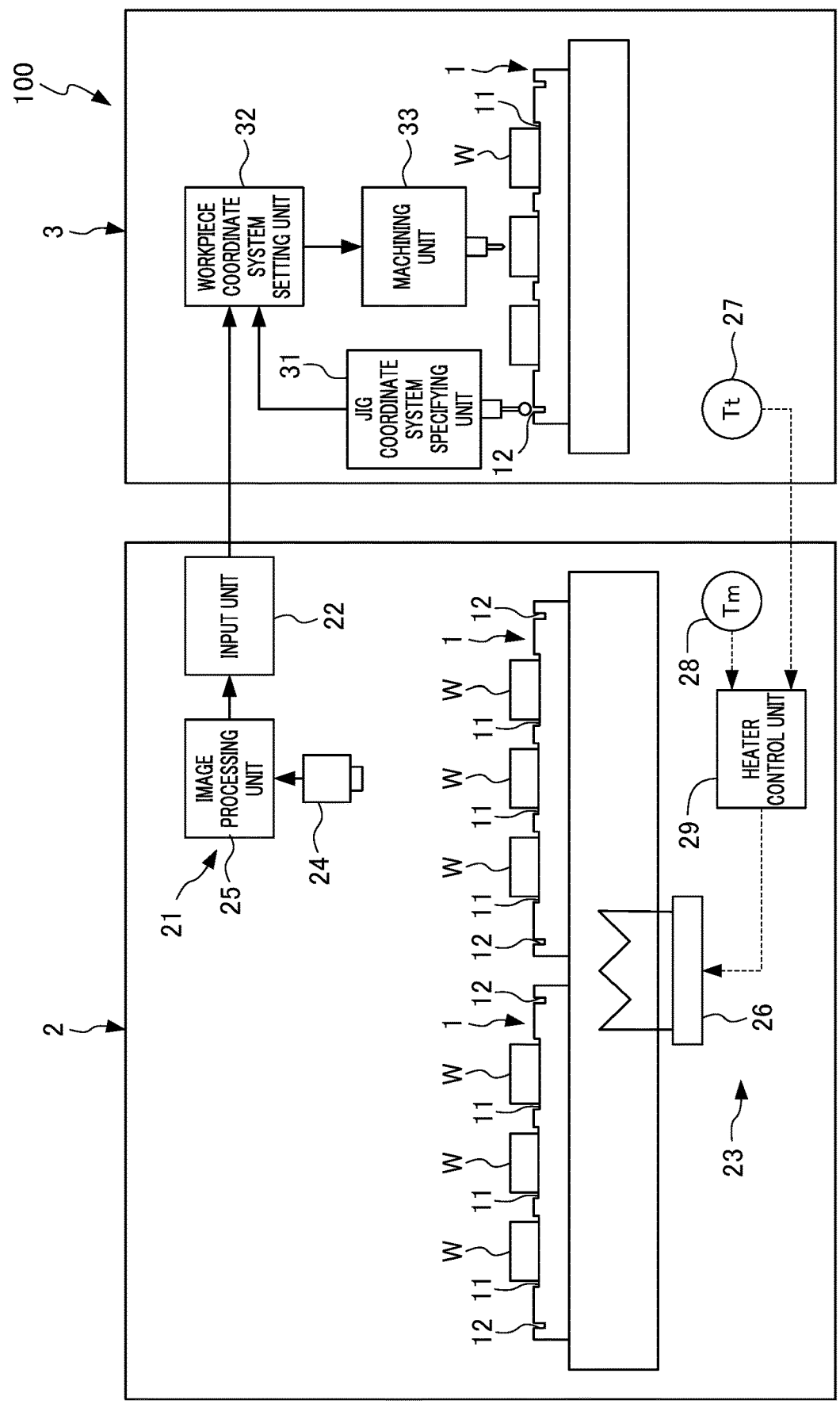
FIG. 1 is a schematic drawing showing the configuration of a machining system according to an embodiment of the present disclosure.

Hereinafter, an embodiment of the present disclosure will be explained while referencing the drawings. FIG. 1 is a schematic drawing showing the configuration of a machining system 100 according to an embodiment of the present disclosure. The machining system 100 machines a workpiece W.

The machining system 100 includes: a jig 1 which retains a plurality of workpieces W; a measurement device 2 which measures the plurality of workpieces W retained on the jig 1; and a machining device 3 which machines the plurality of workpieces W retained on the jig 1.

Figure 2:
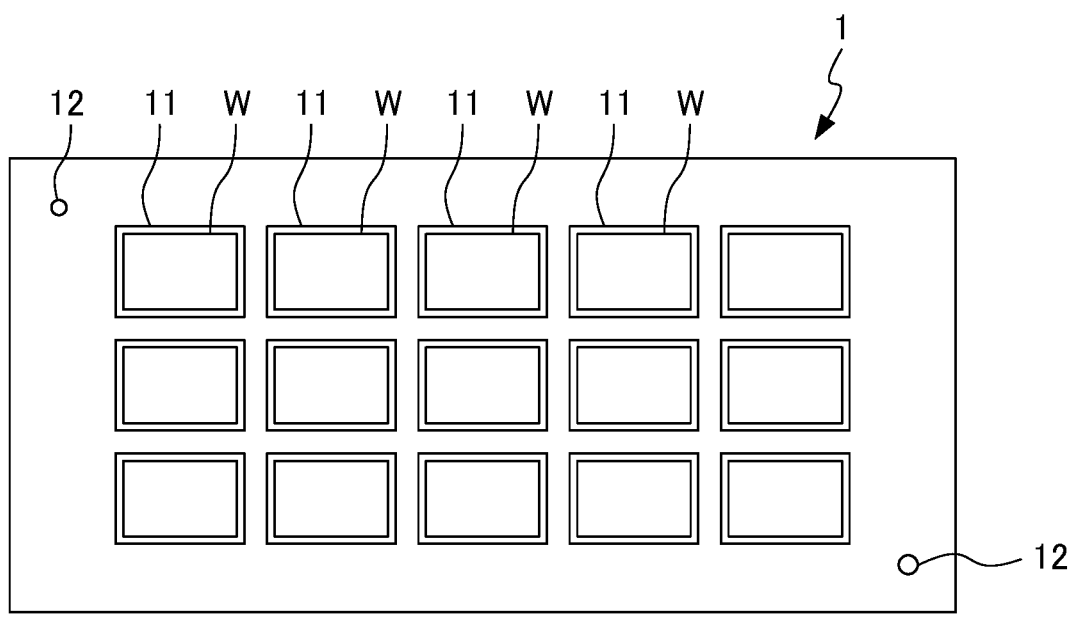
FIG. 2 is a schematic plan view showing a jig of a machining system according to the present disclosure.

The jig 1, as illustrated in FIG. 2, has a plurality of retaining parts 11 which respectively retain the workpieces W, and a reference part 12 which is positioned or positionally detected by the machining device 3.

The retaining part 11 retains each of the workpieces W to be relatively immobile on the jig 1, until measured in the measurement device 2, and then machining completes by the machining device 3. For this reason, the retaining part 11 may have a configuration which can detachably retain the workpiece W such as an electromagnetic force generating means or clamping means, or may have an engaging structure such that can retain the workplace W using an additional engaging means such as a screw, for example.

In this way, the jig 1 has a plurality of retaining parts 11, and when retaining a plurality of the workpieces W, it is not easy to accurately position and retain the individual workpieces w in the jig 1. In other words, the plurality of workpieces W on the jig 1 can have positioning error relative to the retaining part 11.

The reference part 12 is configured to be position detectable or positionable by the measurement device 2 and machining device 3. More specifically, the reference part 12 can be established as a structure such as a hole, notch, protrusion or the like, and may be a corner of the outer edge of the jig 1. In addition, the reference part 12 may be a mark which enables a position to be detected optically, according to the configuration of the measurement device 2 and machining device 3.

The reference part 12 may be simply one according to the configuration of the device configurations of the measurement device 2 and machining device 3; however, a plurality thereof is preferably provided. In other words, the jig 1 preferably has a plurality of the reference parts 12. The machining device 3 can thereby recognize and compensate a difference between the posture of the measurement 2 of the jig 1 and the posture of the machining device 3.

The jig 1 is preferably formed by a material having a small coefficient of thermal expansion such as iron-nickel alloy materials, y machining with the demanded high precision. More specifically, as the upper limit for the coefficient of linear expansion. (absolute value) at 20° C. of the material of the jig 1, it is preferably $10 \times 10^{-6}$/K, and more preferably $2 \times 10^{-6}$/K. By setting the coefficient of linear expansion of the material of the jig 1 to no more than the upper limit, it is possible to suppress the relative position of the workpiece W from shifting and machining error arising, by a temperature change between measuring the workpiece W in the measurement device 2 and ending the machining by the machining device 3.

The measurement device 2 has: a measurement unit 21 which measures the positional relationship of the plurality of workpieces W retained on the jig 1 relative to the reference part 12; an input unit 22 which inputs positional information of the plurality of workpieces W measured by the measurement unit 21 to the machining device 3 using a recording medium or communication; and a temperature adjustment unit 23 which adjusts the temperature of the jig 1 to a temperature substantially equal to the temperature inside of the machining device 3.

While the machining device 3 is machining one workpiece W on the jig 1, the measurement device 2 preferably measures the position of the workpiece W retained on the jig 1 offered to subsequent machining, and the position of the reference part 12 of the jig 1. It is thereby possible to shorten the idle time of machining of the machining device 3, and consequently the cycle time of machining, and improve the machining efficiency. In addition, by shortening the idle time of machining of the machining device 3, it is possible to suppress a temperature decline due to a machining pause of the machining device 3. It is thereby possible to reduce the machining error caused by thermal displacement of the machining device 3.

The measurement unit 21 may measure the position of reference part 12 of the jig 1 and the position of each workpiece W, and may measure the position of each workpiece W in a state positioning the reference part 12 of the jig 1 at a predetermined position.

The measurement unit 21 may be established as a configuration having a touch probe which contacts the workpiece W, and measures the contact position of the touch probe, for example; however, it can be established as a well-known configuration having a camera 24 that photographs the jig 1 retaining the plurality of workpieces W, and an image processing unit 25 that calculates the positions of the plurality of workpieces W, and as necessary, the position of the reference part 12, based on the image photographed by the camera 24.

The camera 24 can be established as a configuration having a two-dimensional image sensor element such as CCD image sensor and CMOS image sensor. The image processing unit 25, for example, can be realized by reading a predetermined image processing program into a computer device having a CPU, memory, etc. By establishing as such a configuration, it is possible to measure the positions of the plurality of workpieces W in an extremely short time.

The input unit 22 can be configured so as to input the positional information of each workpiece W measured by the measurement unit 21 to the machining device 3 as the coordinates in the coordinate system of the jig 1 set based on the coordinate of the reference part 12, or as a combination of coordinates of each workpiece W and coordinates of the reference part 12 in the coordinate system of the measurement device 2.

The recording medium used by the input unit 22 for inputting the positional information to the machining device is not particularly limited; however, it may be an IC tag installed to the jig 1, or the like. Communication used by the input unit 22 for inputting the positional information to the machining device 3 can be performed by a communication means used for transferring various information necessitated for causing the operation of the measurement device 2 and operation of the machining device 3 to cooperate, and may be wireless communication, or may be wired communication.

The temperature adjustment unit 23 adjusts the temperature of the jig 1 inside of the measurement device 2 to a temperature substantially equal to the temperature of the location where the jig 1 is retained during machining of the workpiece W inside the machining device 3. Since the temperature inside of the machining device 3 becomes higher than the environmental temperature by machining, the temperature adjustment unit 23 can be configured to have a heater 26. The heater 26 may conduct heat directly to the jig 1, may heat the jig 1 by way of radiant heat, or may heat the air surrounding the jig 1.

The temperature adjustment unit 23 can be established as a configuration having a machining device temperature acquisition section 27 that acquires the temperature Tt inside of the machining device 3, a measurement device temperature acquisition section 28 that acquires the temperature Tm inside of the measurement device 2, and a heater control section 29 that controls the output of the heater 26 so as to reduce the difference between the temperature Tt inside of the machining device 3 and the temperature Tm inside of the measurement device 2. In addition, the temperature adjustment unit 23 may further have a means for cooling the jig 1, for example, a cooling fan or the like that takes outside air and blows onto the jig 1.

The temperature adjustment unit 23 is preferably configured so as to be able to adjust the temperature of the jig 1 on which position measurement of the workpiece W is performed, and preferably the temperature of the jig 1 on which the position measurement of the workpiece W is performed and the temperature of the jig 1 during standby in which the position measurement of the workpiece W is performed subsequently and thereafter. Since the time for temperature adjustment of the jig 1 will thereby not increase the cycle time of measurement by the measurement unit 21, the measurement device 2 will not become a cause for increasing the cycle time of the machining of the machining device 3.

As the upper limit for the difference between the temperature of the jig 1 during measurement by the measurement unit 21 and the temperature within the machining device 3, it is preferably 10° C. By setting the difference between the temperature of the jig 1 during measurement by the measurement unit 21 and the temperature within the machining device 3 to no more than the upper limit, it is possible to suppress the machining error from thermal displacement. It should be noted that, even in a case of the thermal expansion coefficient of the jig 1 being sufficiently small, since there is a possibility of the thermal displacement arising in the workpiece W, it is preferable to adjust the temperature of the jig 1 in the measurement device 2 by way of the temperature adjustment unit 23, irrespective of the material of the jig 1.

The machining device 3 has: a jig coordinate system specification unit 31 which specifies the coordinate system during machining of the jig 1, by way of positioning or position measuring the reference part 12 of the jig 1, a workpiece coordinate system setting unit 32 which individually sets the coordinate systems of each of the plurality of workpieces W based on the positional information inputted from the input unit; and a machining unit 33 which machines the workpiece W using the coordinate system of the workpiece set by the workpiece coordinate system setting unit 32.

The jig coordinate system specification unit 31 specifies the coordinate system of the jig 1 relative to the coordinate system of the machining device 3, i.e. specifies the position and posture of the jig 1 within the machining device 3.

The workpiece coordinate system setting unit 32 sets the coordinate systems of individual workpieces W, i.e. converts the coordinates of machining specified by the machining program into the coordinates of the coordinate system of the workpieces W, respectively.

The machining unit 33 adjusts the operation of the tool according to the arrangement of each workpiece W using the coordinate system of the workpiece set by the workpiece coordinate system setting unit 32, and appropriately machines each workpiece W.

Although the machining performed by the machining unit 33 is not particularly limited, it is possible to exemplify drilling, laser machining, milling, etc.

Figure 3:
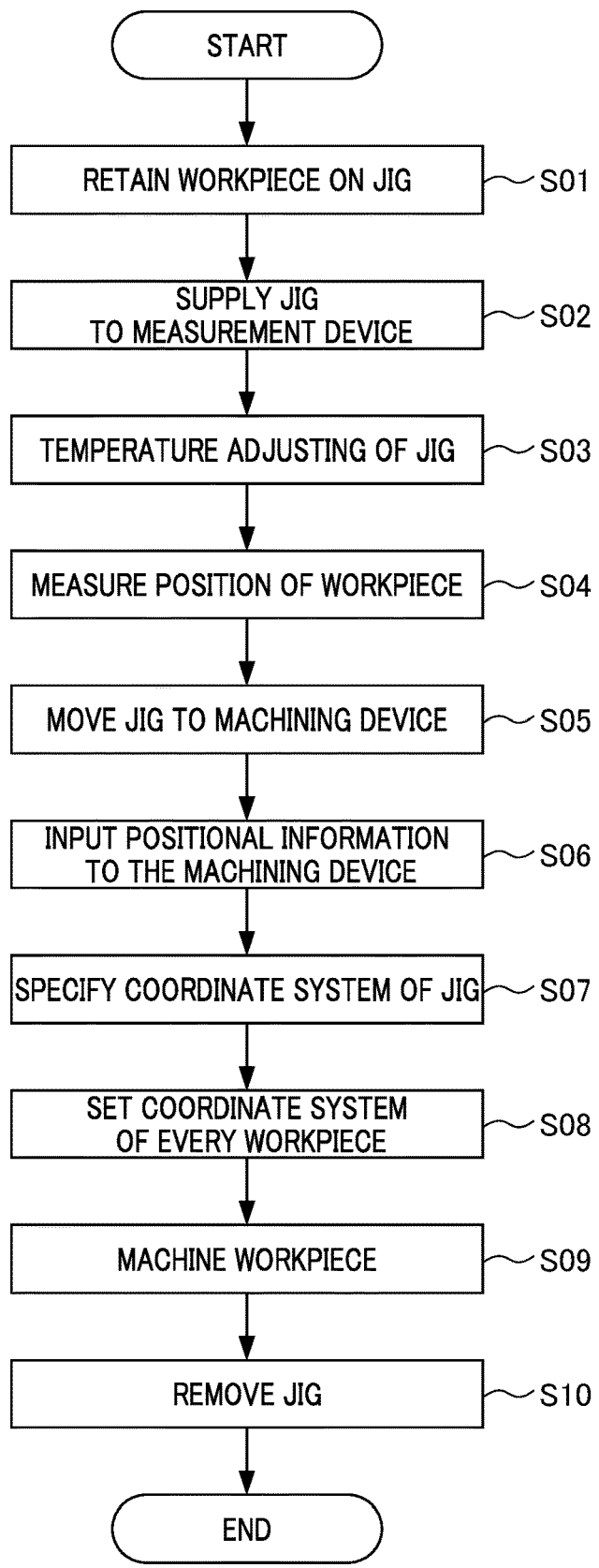
FIG. 3 is a flowchart showing a machining sequence of a machining system according to the present disclosure.

In the machining system 100, the method of machining the plurality of workpieces W (machining method according to an embodiment of the present disclosure), as shown in FIG. 3, includes: a step of retaining the plurality of workpieces W in the jig 1 (Step S01: retaining step); step of supplying the jig 1 to the measurement device 2 (Step S02: jig supplying step); step of adjusting the temperature of the jig 1 (Step S03: temperature adjusting step); step of measuring the positions of the plurality of workpieces W retained by the jig 1 (Step S04: measuring step); step of moving the jig 1 to the machining device 3 (Step S05: jig moving step); step of inputting the positional information of the workpiece W from the measurement device 2 to the machining device 3 (Step S06: positional information inputting step); step of specifying the coordinate system of the jig 1 (Step S07: jig coordinate system specifying step); step of setting the coordinate system of each workpiece W (Step S08: workpiece coordinate system setting step); step of machining each workpiece W (Step S09: machining step); and step of removing the jig 1 from the machining device 3 (Step S10: jig removal step).

In the retaining step of Step S01, the respective workpieces W are held in the retaining part 11 of the jig 1. This retaining step may be performed successively, and may cause the plurality of workpieces W to each be retained in a plurality of jigs 1 in advance.

In the jig supplying step of Step S2, the jig 1 retaining the plurality of workpieces W in the retaining step is supplied to the measurement device 2.

In the temperature adjustment step of Step S03, the temperature of the jig 1 retaining the workpieces W is adjusted so as to be a temperature substantially equal to the temperature inside of the machining device 3, by way of the temperature adjustment unit 23.

In the measurement step of Step S04, the positional relationship of the plurality of workpieces W retained by the jig 1 relative to the reference part 12 of the jig 1 is measured by the measurement unit 21.

In the jig movement step of Step S05, the jig 1 measuring the position of the workpiece W is made to move from the measurement device 2 to the machining device 3. This movement may be performed manually by the operator; however, for example, it is preferable to automatically perform using a conveyor system or the like.

In the positional information input step of Step S06, the positional information of the workpiece W measured in the measurement step is inputted from the measurement device 2 to the machining device 3 by the input unit 22.

In the jig coordinate system specifying step of Step S07, the coordinates of the reference part 12 of the jig 1 is specified by the jig coordinate system specifying unit 31. In other words, in the positional information input step, by measuring the position of the reference part 12, or positioning the reference part 12 at a predetermined position, the coordinate system of the machining device 3 is made convertible to the coordinate system of the jig 1.

In the workpiece coordinate system setting step of Step S08, the coordinate systems of the respective workpieces W are made settable individually, i.e. coordinate system of the machining device 3 is made convertible to the coordinate system of each workpiece W, based on the positional information inputted by the input unit 22 and the coordinate system of the jig 1 specified in the jig coordinate system specifying step, by the workpiece coordinate system setting unit 32.

In the machining step of Step S09, each workplace W is machined using the coordinate system of this workpiece W, by the machining unit 33. In other words, the machining unit 33 accurately machines the workpiece W, by converting machining data decided based on a machining program and represented as relative movement between a workpiece W and tool in the coordinate system of the workpiece W to be machined, into the coordinate system of the machining device 3.

In the jig removal step of Step S10, the jig 1 retaining the machined workpiece W is ejected from the machining device 3. The jig 1 retaining the workpiece W to be machined next becomes receivable. Therefore, prior to this jig removal step completing, it is preferable to perform each step in parallel so that the measurement step ends for the jig 1 retaining the workpiece W to be machined next.

In the above way, the machining system 100 of the present embodiment confirms the setting error of the plurality of workpieces W relative to the jig 1 in the measurement device 2, and by performing only positioning or positional measurement of the reference part 12 of the jig 1 in the machining device 3, it is possible to specify the position of each of the plurality of workpieces W, and machine precisely. For this reason, the machining system 100 can shorten interval of machining in the machining device 3, and improve the production efficiency. In addition, the machining system 100 can suppress a temperature change of the machining device 3, and suppress machining error caused by thermal displacement, by shortening the interval of machining in the machining device 3.

Although an embodiment of a machining system and machining method according to the present disclosure has been explained above, the machining system and machining method according to the present disclosure are not limited to the aforementioned embodiment. In addition, the effects described in the present embodiment are merely listing the most preferred effects produced from the present disclosure, and the effects from the machining system and machining method according to the present disclosure are not limited to those described in the present embodiment.

In the machining system according to the present disclosure, the temperature adjustment unit may be omitted. In addition, in the machining system according to the present disclosure, the temperature adjustment unit may adjust the temperature of only a singular jig.

In the machining method according to the present disclosure, the retaining step may be performed after the jig supplying step. In other words, in the machining method according to the present disclosure, the workpiece may be retained after arranging the jig in the measurement device.

EXPLANATION OF REFERENCE NUMERALS

1 jig
2 measurement device
3 machining device
11 retaining unit
12 reference part
21 measurement unit
22 input unit
23 temperature adjustment unit
24 camera
25 image processing unit
26 heater
27 machining device temperature acquisition section
28 measurement device temperature acquisition section
29 heater control section
31 jig coordinate system specifying unit
32 workpiece coordinate system setting unit
33 machining unit
100 machining system
W workpiece

What is claimed is:

1. A machining system comprising:
   a jig which retains a plurality of workpieces;
   a measurement device which measures the plurality of workpieces retained on the jig; and
   a machining device which machines the plurality of workpieces retained on the jig,
   wherein the jig has a reference part which is positioned or position detected by the machining device,
   wherein the measurement device has:
   a measurement unit which measures a positional relationship of the plurality of workpieces retained on the jig relative to the reference part, and
   an input unit which uses a recording medium or communication to input positional information of the plurality of workpieces measured by the measurement unit to the machining device, and
   wherein the machining device has:
   a jig coordinate system specifying unit which specifies a coordinate system of the jig in the machining device, by positioning or position measuring the reference part of the jig, and
   a workpiece coordinate system setting unit which individually converts the coordinate system of the jig specified by the jig coordinate system specifying unit to a coordinate system of each of the plurality of workpieces based on the positional information inputted from the input unit.

2. The machining system according to claim 1, wherein the jig has a plurality of the reference parts.

3. The machining system according to claim 1, wherein the measurement device has a temperature adjustment unit which adjusts temperature of the jig within the measurement device to be substantially equal to temperature within the machining device.

4. The machining system according to claim 1, wherein a linear expansion coefficient of the material of the jig is no more than $10 \times 10^{-6}$/K.

5. The machining system according to claim 1, wherein the measurement unit has: a camera which photographs an image of the jig retaining the plurality of workpieces, and an image processing unit which calculates a position of the plurality of workpieces and a position of the reference part, based on the image photographed by the camera.

6. The machining system according to claim 1, wherein the measurement device performs measurement of the workpiece retained on the jig supplied to subsequent machining, while the machining device is machining.

7. The machining system according to claim 3, wherein the temperature adjustment device comprises:
   a machining device temperature acquisition section that acquires temperature inside of the machining device separately provided from the machining device;
   a measurement device temperature acquisition section that acquires temperature inside of the measurement device; and
   a heater that is provided in the measurement device; and
   a heather control section that controls output of the heater,
   wherein the temperature adjustment device controls the heater control section to adjust the temperature of the jig within the measurement device to be substantially equal to the temperature within the machining device.

8. A machining method comprising the steps of:
   retaining a plurality of workpieces in a jig having a reference part which is positioned or positionally detected by a machining device;
   measuring a positional relationship of the plurality of workpieces retained on the jig relative to the reference part;
   moving the jig to the machining device;
   specifying a coordinate system of the jig by positioning or positionally measuring the reference part of the jig in the machining device;
   converting the specified coordinate system of the jig to a coordinate system of each of the plurality of workpieces individually based on the positional relationship of the plurality of workpieces relative to the reference part; and machining the workpiece by way of the machining device using the converted coordinate system of the workpiece.

9. The machining method according to claim 8, wherein the method comprises, prior to measuring the positional relationship, a step of adjusting temperature of the jig within a measurement device separately provided from the machining device to be substantially equal to temperature within the machining device.

10. The machining method according to claim 9, wherein the step of adjusting temperature of the jig acquires temperature inside of the machining device; acquires temperature inside of the measurement device; and controls output of a heater provided in the measurement device to adjust the temperature of the jig within the measurement device to be substantially equal to the temperature within the machining device.

* * * * *